(12) United States Patent
McIntyre et al.

(10) Patent No.: US 11,541,588 B2
(45) Date of Patent: Jan. 3, 2023

(54) MULTILAYER PLASTIC BOTTLES WITH MINERAL FILLER AND FOAMED LAYER FOR IMPROVED RECYCLABILITY

(71) Applicant: THE CLOROX COMPANY, Oakland, CA (US)

(72) Inventors: William D. McIntyre, Castro Valley, CA (US); Lisa H. Olson, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 154 days.

(21) Appl. No.: 17/116,096

(22) Filed: Dec. 9, 2020

(65) Prior Publication Data
US 2021/0086428 A1  Mar. 25, 2021

Related U.S. Application Data

(63) Continuation of application No. 14/700,545, filed on Apr. 30, 2015, now Pat. No. 10,889,047, which is a
(Continued)

(51) Int. Cl.
*B29C 49/22* (2006.01)
*B29C 49/04* (2006.01)
(Continued)

(52) U.S. Cl.
CPC .......... *B29C 49/22* (2013.01); *B29C 49/0005* (2013.01); *B29C 49/04* (2013.01);
(Continued)

(58) Field of Classification Search
CPC ... B29C 48/16; B29C 48/335; B29C 48/0012; B29C 48/001; B29C 70/02; B29C 49/04; B29C 49/0005; B29C 49/22; B65D 1/0215
See application file for complete search history.

(56) References Cited

U.S. PATENT DOCUMENTS 6,376,059 B1  4/2002  Anderson
6,488,874 B2  12/2002  Lin
(Continued)

OTHER PUBLICATIONS

Shackelford, James F. Alexander, William, (2001). CRC Materials Science and Engineering Handbook (3rd Edition) Table 42. Specific Gravity of Polymers. Taylor & Francis. Retrieved from (Year: 2001).

*Primary Examiner* — Stella K Yi
(74) *Attorney, Agent, or Firm* — Edell, Shapiro & Finnan, LLC

(57) ABSTRACT

Plastic containers exhibiting reduced plastic resin usage, while maintaining a specific gravity of below 1.0, so as to allow their quick and easy separation using floatation techniques during recycling. Within a layer or portion some of the plastic resin of the container body may be replaced with an inorganic mineral filler material, while within another layer or portion of the plastic container, the plastic material (e.g., polyethylene, polypropylene) may be foamed. The fraction of mineral filler material that may be included within the polyethylene may thus be increased beyond that previously possible while maintaining the specific gravity below 1.0, by also foaming a layer or portion of the polymeric material, so as to create voids therein. This allows significantly less resin material to be employed, while maintaining strength characteristics of the plastic container so as to be at least comparable to existing plastic containers not including such mineral filler materials.

20 Claims, 6 Drawing Sheets

Related U.S. Application Data continuation of application No. 14/639,869, filed on Mar. 5, 2015, now abandoned.

(51) Int. Cl.
    *B29C 49/00*     (2006.01)
    *B65D 1/02*     (2006.01)
    *B29L 31/00*     (2006.01)

(52) U.S. Cl.
    CPC ........ *B65D 1/0215* (2013.01); *B29K 2023/04* (2013.01); *B29K 2909/00* (2013.01); *B29L 2031/712* (2013.01)

(56) References Cited

U.S. PATENT DOCUMENTS

| | | |
|---|---|---|
| 6,706,223 B1 | 3/2004 | Anderson |
| 2002/0145216 A1 | 10/2002 | Lin |
| 2006/0073298 A1 | 4/2006 | Hutchinson et al. |

MULTILAYER PLASTIC BOTTLES WITH MINERAL FILLER AND FOAMED LAYER FOR IMPROVED RECYCLABILITY

CROSS-REFERENCE TO RELATED APPLICATIONS

This patent application is a continuation of co-pending U.S. patent application Ser. No. 14/700,545, filed on Apr. 30, 2015, entitled "MULTILAYER PLASTIC BOTTLES WITH MINERAL FILLER AND FOAMED LAYER FOR IMPROVED RECYCLABILITY", which is a continuation of U.S. patent application Ser. No. 14/639,869, filed Mar. 5, 2015. The disclosures of each of the above applications are hereby incorporated by reference in their entirety.

BACKGROUND OF THE INVENTION

1. The Field of the Invention

The present invention is generally related to recyclable plastic bottles or other containers. In particular, the invention relates to plastic bottles that include a mineral filler material (e.g., an inorganic filler such as $CaCO_3$), while providing for higher filler loadings than previously possible, while still providing recyclability.

2. Description of Related Art

Plastic bottles are often made from polyolefin materials. Such plastic materials may typically have a specific gravity of from 0.900 to about 0.963. Pigments are sometimes added to such materials, which may raise the specific gravity somewhat. In many communities, such bottles or other containers can be recycled, with polyolefin bottles or other containers in the recycling stream being separated from glass, ceramic, polyester, or other materials using floatation separation in a floatation tank. This limits uses of mineral filler materials, which typically have densities significantly greater than that of water. The addition of too much mineral filler to polyolefin will cause the resulting plastic container to sink in the floatation tank.

Thus, cost reductions and environmental benefits that could be obtained due to lower use of petrochemical resin raw materials are limited, where it is desired to still facilitate floatation separation and recycling of such containers. It would be a benefit in the art to provide the ability to increase loading of mineral filler materials, while still facilitating floatation separation in recycling of such containers.

BRIEF SUMMARY OF THE INVENTION

In an embodiment, the present invention is directed to a plastic container comprising single or multiple layers, which exhibits improved recyclability and reduced use of petrochemical resin raw materials. An exterior first layer may comprise a polyolefin, an interior second layer may comprise a polyolefin, and an interior third layer may also comprise a polyolefin. At least one of the layers may comprise at least one of post-consumer or post-industrial recycled material (e.g., reground polyethylene, reground polypropylene). The polyolefin of at least one of the layers may be foamed, e.g., a cellular foamed layer including closed cells of a foaming agent within a polyethylene matrix. At least one of the layers (e.g., other than the foamed layer) may include a mineral filler material (e.g., calcium carbonate and/or talc), which provides increased strength characteristics and reduces the amount of polyolefin needed.

The mineral filler material may be included in an amount of at least 5% (e.g., at least 7%, or at least 8%) by weight of the layer within which it is included, while the specific gravity of all of the layers of the plastic container combined together is greater than 0.90 and below 1.0, so that the plastic container floats in water. In an embodiment, the mineral filler may be included in an amount that is sufficient so that the specific gravity of the plastic container would be greater than 1.0 if none of the layers comprised foamed polyolefin. In other words, inclusion of a relatively high fraction of the mineral filler can be offset (relative to specific gravity) by foaming the polyolefin within at least one of the layers of the container, so that the specific gravity for the container overall remains less than 1.0, so that the container will float.

Another embodiment is directed to a plastic container including an exterior first layer, the first layer including a polyolefin and a colorant (e.g., $TiO_2$), an interior second layer comprising a polyolefin, an interior third layer comprising a polyolefin, and an interior fourth layer comprising a polyolefin. At least one of the layers includes a mineral filler material, at least one of the layers comprises at least one of post-consumer or post-industrial recycled material, and the polyolefin of at least one of the layers is foamed. The specific gravity of the plastic container as a whole is greater than 0.90 and below 1.0.

Another embodiment is directed to a plastic container comprising a container body including at least one layer, with at least one layer comprising a polyolefin, wherein at least a portion of the container body comprises foamed a polyolefin. The specific gravity of the plastic container is below 1.0. In addition, the container body includes mineral filler in an amount that is sufficient so that the specific gravity of the plastic container would be greater than 1.0 without the foamed a polyolefin, and has a specific gravity greater than 0.90 and below 1.0. In other words, the inclusion of the foamed a polyolefin offsets some of the increase in specific gravity that would otherwise occur due to the mineral filler loading, bringing the specific gravity of the plastic container as a whole down below 1.0, so that it floats in water. Such a plastic container may include a single or multiple layers.

Such containers thus may provide a bulk specific gravity for the container as a whole that is below 1.0 (e.g., from greater than 0.90 to below 1.0, or from 0.95 to below 1.0, from 0.97 to below 1.0, or from 0.98 to below 1.0). This allows the container to float on water, while permitting relatively high loading of the mineral filler material (e.g., which includes a density significantly greater than 1.0 $g/cm^3$) within one or more of the layers of the plastic container, which relatively higher loading (and higher density) can be counterbalanced by the relatively low density of the foamed layer or portions. For example, such containers may include one or more layers having a specific gravity greater than 1.0, while the bulk specific gravity of the container as a whole remains below 1.0, due to the presence of the foamed layer(s). In another embodiment, the mineral filler material may be included in an amount that would drive the specific gravity of the resulting plastic container over 1.0, but for the presence of the foamed layer or portion, which counteracts the specific gravity increase caused by the increased mineral filler loading, ensuring that the specific gravity for the container remains below 1.0, so that it will float.

Another embodiment is directed to a method of forming a blow-molded plastic article. Such a method may include providing a polymeric material for a parison, the polymeric material comprising a polyolefin (e.g., polyethylene, polypropylene). The polymeric material is conveyed in a downstream direction in an extruder, and a mineral filler material and a foaming agent (e.g., a physical foaming or blowing agent or a chemical foaming agent) are introduced into the extruder (e.g., where they may be mixed with the polymeric material). The mineral filler material and foaming agent may be introduced into the extruder and the polymeric material in any desired order, at any desired location along the extruder.

The terms foaming agent and blowing agent may be used interchangeably herein. The mineral filler may be disposed in at least a portion of the polymeric material (e.g., it may be in a different portion than the foaming agent, so that a portion includes the foaming agent, and another portion or portions include the mineral filler). The mixture of foaming agent and polymeric material may be subjected to blow molding conditions to form a cellular foamed blow-molded article. The specific gravity of the blow-molded article is greater than 0.90 and below 1.0. Such a plastic blow-molded article may include a single or multiple layers.

Another embodiment is directed to a method of forming a blow-molded plastic article including multiple layers. Such a method may include providing a polymeric material for a multilayer parison, where the polymeric material includes a polyolefin, each layer including a polyolefin. The polymeric material may be conveyed in a downstream direction in an extruder (e.g., with mineral filler and foaming agent being added as the polymeric material is conveyed downstream in the extruder). For example, a physical or chemical foaming agent may be introduced to form a mixture of foaming agent and the polymeric material (e.g., a single phase solution with foaming agent (e.g., supercritical) dissolved in the polymeric material). The mixture may be subjected to conditions (e.g., rapid pressure drop) causing formation of a cellular foam where tiny cells of the foaming agent are dispersed (e.g., as closed cells) within a matrix of the polymeric material. Another layer of the blow-molded article comprises a polyolefin and the mineral filler material (e.g., so the filler and foam may be in separate, distinct layers). As in the embodiments described above, the specific gravity of all of the layers of the plastic container combined together may be greater than 0.90 and below 1.0.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Definitions

Figure 1:
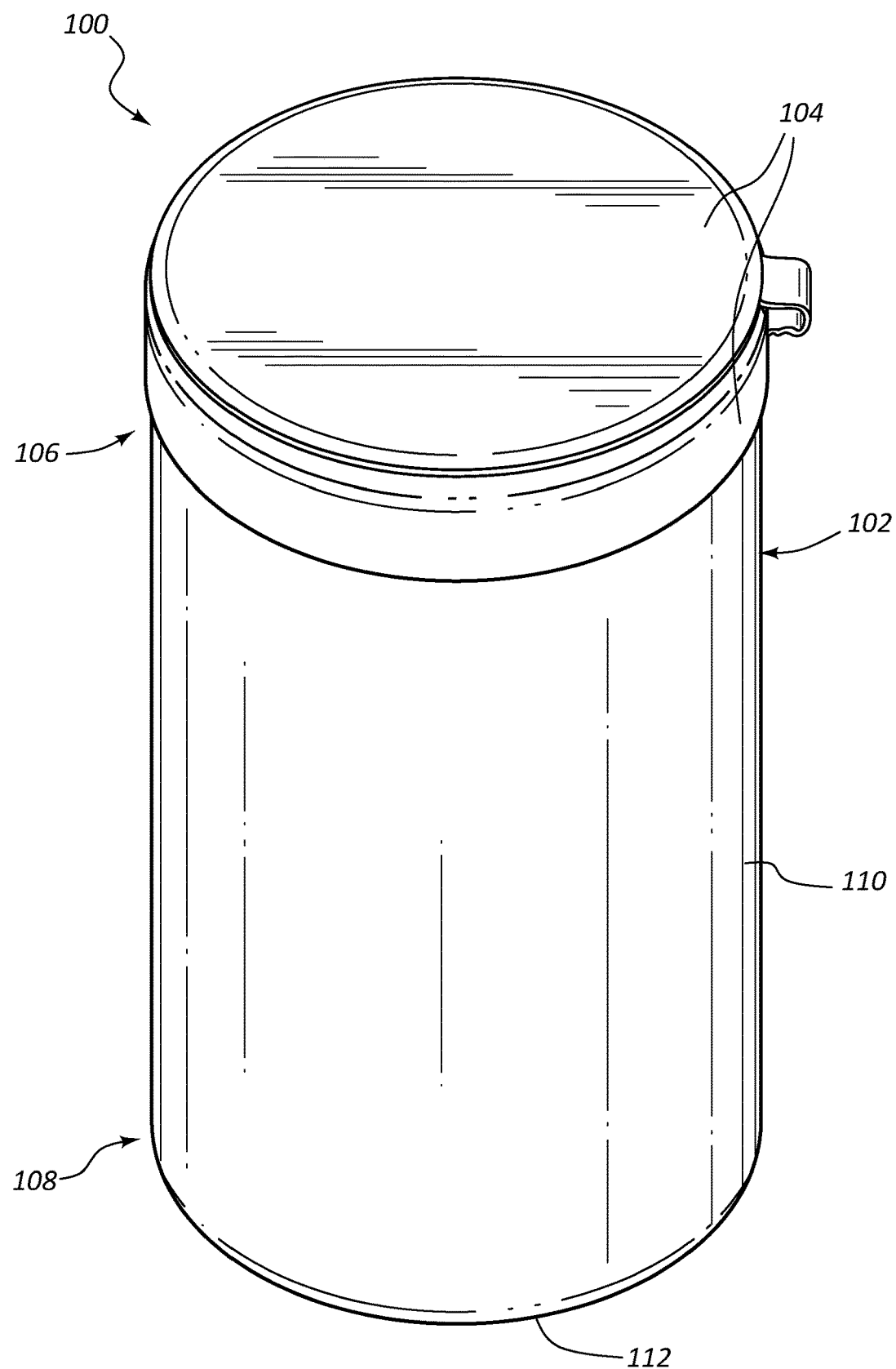
FIG. 1 is a perspective view of an exemplary plastic container according to an embodiment of the present invention.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "mineral filler material" includes one, two or more mineral filler materials.

The terms "mineral filler" and "mineral" are interchangeable for the purpose of describing the present invention. The purpose of the mineral filler may be merely to displace polymer. Alternatively, there are specialty formulations where the mineral serves may also serve a useful purpose that improves the performance of the plastic part (e.g. improving strength, rigidity, durability etc. of the plastic).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention is directed to plastic containers exhibiting reduced plastic resin usage, while maintaining a specific gravity of below 1.0, so as to allow their quick and easy separation using a floatation tank during a recycling process. Thus, the plastic containers exhibit recyclability characteristics comparable to those of existing plastic containers, but also exhibit the ability to reduce usage of plastic resin raw materials employed in the manufacture of such containers, by inclusion of an inorganic mineral filler material within a matrix of the plastic resin material. The fraction of mineral filler material that may be included within the polyethylene or other polyolefin polymeric material may be increased beyond that previously possible while maintaining the specific gravity below 1.0, by also foaming a layer or portion of the polymeric material, so as to create voids therein. This allows even less polymeric resin material to be employed, while maintaining strength and other characteristics of the plastic container so as to be at least comparable to existing plastic containers not including such mineral filler materials.

In other words, a portion of the polyolefin resin material may be replaced with a mineral filler material, and an increase in specific gravity resulting from the loading with the mineral filler may be at least partially offset by foaming the polyolefin resin material (e.g., within another layer of the container that does not include mineral filler material), so that the specific gravity of the container as a whole remains below 1.0.

III. Exemplary Plastic Containers

FIG. 1 shows an exemplary plastic container 100 according to an embodiment of the present invention. The plastic container 100 may be any type or shape of plastic container used to hold any of numerous articles, such as, but not limited to a canister for holding disinfecting wipes, cleaning wipes, or a bottle, box, or other shaped container for holding any desired articles, which container may be formed by blow-molding. Such a plastic container is configured to be recyclable, e.g., formed from a polyolefin material such as polyethylene. Various polyolefins other than polyethylene, e.g., polypropylene, may also be suitable for use, although polyethylene may be particularly suitable for use.

Figure 2:
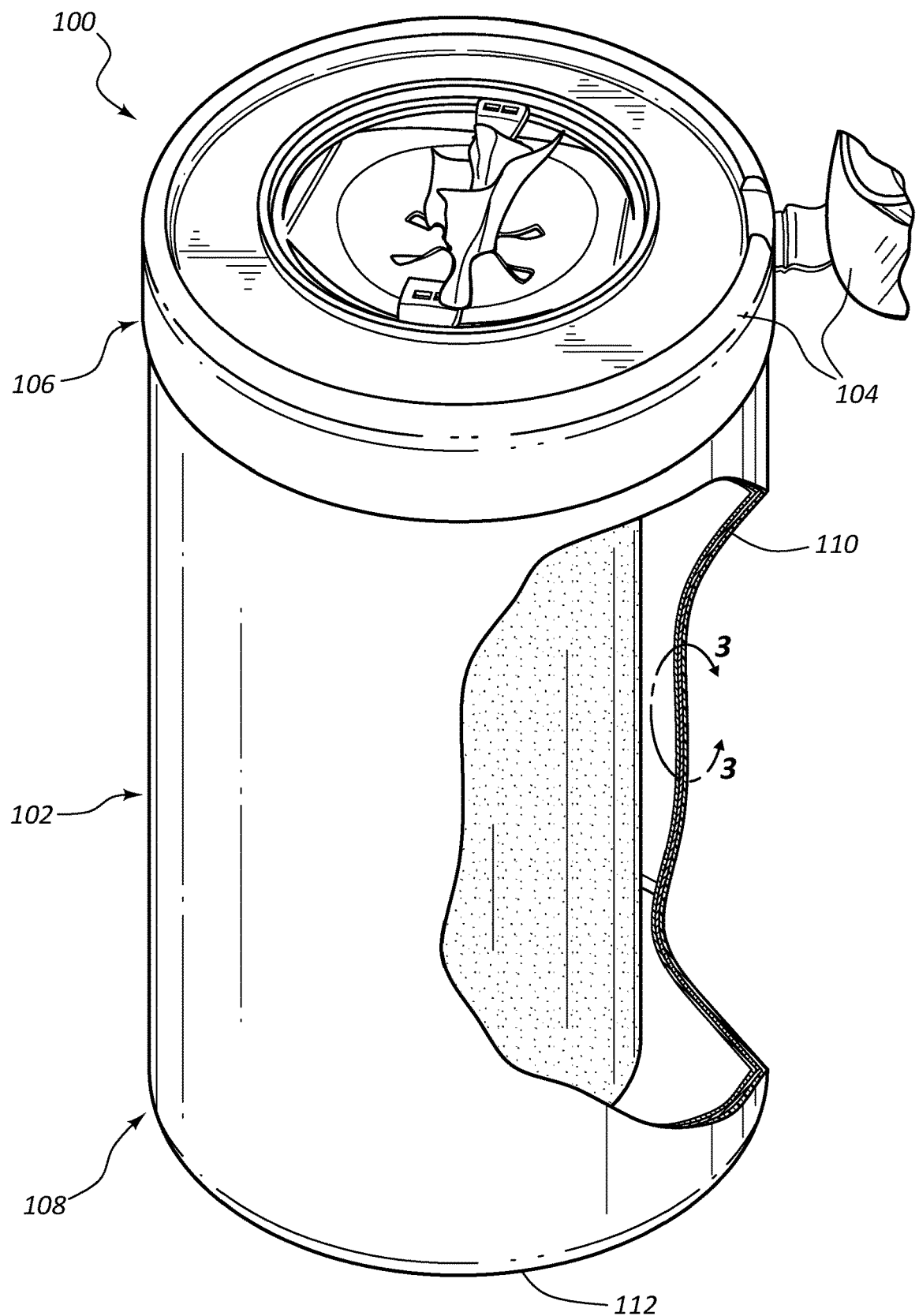
FIG. 2 shows a cut away view through a sidewall of the plastic container of FIG. 1.
Figure 3:
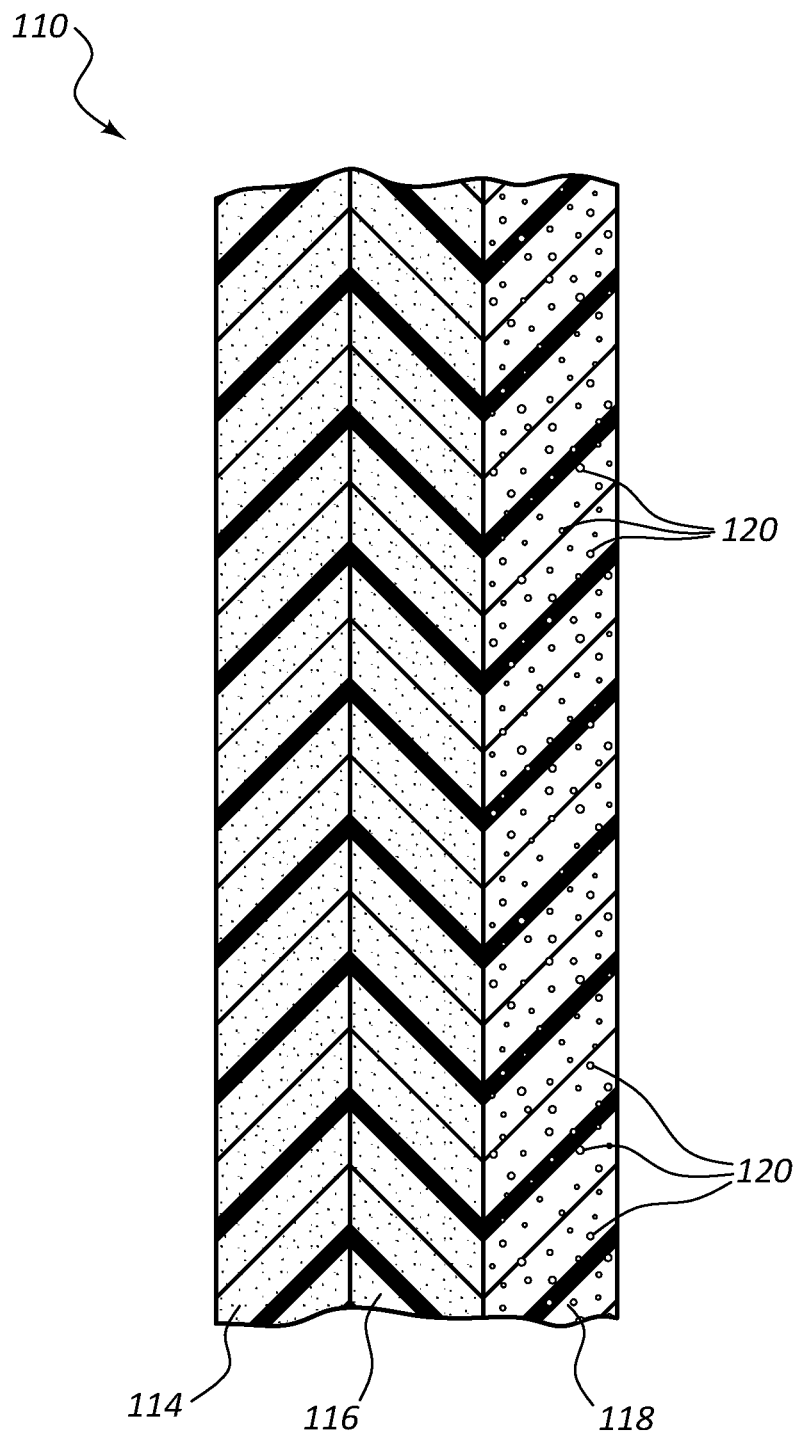
FIG. 3 is a cross-sectional view through an exemplary plastic container sidewall of the present invention, where the plastic container includes 3 layers.

Container 100 may include a container body 102, as well as a container lid 104 configured to close over the open top 106 of container body 102. As shown, in an embodiment, container body 102 may be generally cylindrically shaped, including a closed bottom 108, and an open top 106. An attached or separate lid 104 may be provided for covering open top 106. Lid 104 may be formed by injection molding, and may comprise a single layer (e.g., of similar plastic materials, such as polyethylene). FIG. 2 illustrates a cut-away portion through the sidewall of container body 102, while FIG. 3 illustrates a more magnified close up view of the sidewall of container body 102, illustrating how container body 102 may include a plurality of layers which together make up the sidewall 110 and bottom 112 of container body 102.

Inclusion of a plurality of layers within container body 102 allows for each layer to include distinct compositional characteristics. Such characteristics may be specifically tailored to provide container body 102 with an overall specific gravity that is below 1.0, so that container body 102 can be easily separated from other articles during recycling, while at the same time allowing for a reduction in the amount of polymeric resin (e.g., polyethylene, polypropylene) used in forming container body 102, without necessarily decreasing wall thickness or other dimensional characteristics of container body 102. This may be achieved by replacing a portion of the polymeric resin material (e.g., polyethylene, polypropylene) with a mineral filler material. Such a mineral filler material may be incorporated into the polymeric resin material, reducing the amount of polymeric resin material needed to manufacture the container body. This may allow for wall thicknesses to actually remain the same, or even increase in thickness.

In an embodiment, the reduction in polymeric resin material may be at least 5%, at least 7%, at least 8%, at least 10%, at least 12%, at least 15%, from 8% to 25%, from 8% to 20%, from 8% to 15%, from 9% to 20%, from 9% to 15%, from 10% to 15%, or other ranges defined between any of such values (e.g., 8% to 12%), while providing strength characteristics to the container body that are similar to those that would be provided where the entire container body were made of the polymeric resin, without any mineral filler material, or a foamed polyolefin.

It will be apparent from the present disclosure that there is a limit to the amount of mineral filler which may be added to the polymeric material of the container body, while still maintaining an overall specific gravity that is below 1.0, absent other changes to offset the increased specific gravity caused by the inclusion of the mineral filler material. For example, while polyethylene has a density of about 0.91 g/cm$^3$ to about 0.97 g/cm$^3$ (e.g., high density polyethylene (HDPE) having a density of about 0.94 g/cm$^3$ to about 0.97 g/cm$^3$, depending on specific characteristics), the density of a mineral filler material, such as calcium carbonate ($CaCO_3$) is about 2.7 g/cm$^3$. Calcium carbonate mineral filler material may be added as a concentrate thereof, mixed with the polyethylene or other resin material (e.g., 70%-80% $CaCO_3$ and 20%-30% polyethylene). As such, it will be appreciated that the density and specific gravity of such a $CaCO_3$ concentrate may be somewhat less than 2.7.

In any case, it will be apparent that too high a fraction of $CaCO_3$ will cause the resulting container body to exhibit a specific gravity that is greater than 1.0, so that the resulting container body will no longer float. For example, in HDPE containers that already include a small fraction of $TiO_2$ colorant, addition of $CaCO_3$ would be limited to about 5.5% by weight (and a specific gravity of 1.0), even though further reductions in resin usage could be achieved with higher mineral filler loadings.

As such, according to embodiments of the present invention, at least a portion or layer of the container body is also foamed, so as to decrease density and specific gravity within the foamed portion. For example, a foaming agent may be introduced into at least a portion of the a polyolefin resin material of the container body, so as to result in a matrix of cellular voids dispersed within the polyolefin material within the finished container body. In other words, a portion or layer of the polyolefin of the container body may be foamed, including tiny cells of foaming agent (e.g., nitrogen, carbon dioxide, or other gas) trapped within the polyolefin matrix. Such a foamed portion or layer exhibits decreased density and specific gravity, because of the tiny voids where the polyolefin material has been displaced. Such a foamed portion or layer may be employed to offset the increased density and specific gravity associated with the inclusion of a mineral filler material within the polyolefin matrix.

As a result, higher mineral material loadings may be provided, while maintaining the overall specific gravity below 1.0, because at least a portion of the increased gravity is offset by foaming a portion or layer of the polyolefin material. In an embodiment, the foamed layer or portion may be kept separate from the mineral filler material, as the inclusion of foaming agent and a mineral filler within the same portion or layer may result in unwanted interactions between such components. For example, the mineral filler may nucleate formation of foamed cells, which may be undesirable. As such, the foamed polyolefin may be present within one layer, while the mineral filler may not be present in the foamed layer, but may be present within one or more other layers.

Of course, where the container body is formed of only a single layer, both foaming and mineral filler may be present within the same single layer. In some embodiments, efforts may be made to still attempt to separate the foaming agent from the mineral filler material, e.g., by introducing foaming agent into one side of a single layer, while introducing mineral filler material into the opposite side of the single layer. Such may result in a structure where the single layer includes differently configured portions, effectively providing a pseudo multiple layer structure. In other embodiments, the foaming agent may be introduced into the same portion(s) as the mineral filler material is present. As mentioned, it may be preferred to maintain separation between the foaming agent and the mineral filler material.

FIG. 3 shows a close up of a cross-section of an exemplary sidewall 110, illustrating an example of the present invention including three layers. For example, exterior first layer 114 may form the exposed exterior surface of sidewall 110. An interior second layer 116, and an interior third layer 118 may also be provided. At least one of the layers 114-118 may differ from another of the layers in compositional characteristics. For example, although each layer may comprise a polyolefin, one or more additional components, such as a foaming agent, a mineral filler material, a colorant, etc. may be present within some of the layers. For example, a mineral filler material such as calcium carbonate may be added to one or more of the layers. At least one of the layers may comprise a polyolefin into which a foaming agent has been introduced, so that the polyolefin is foamed. The inclusion of the mineral filler material increases the specific gravity of the container 100, while foamed polyolefin serves to decrease the specific gravity of the container. Thus, inclusion of the foamed polyolefin serves to offset at least some of the increase in specific gravity provided by the mineral filler material loaded within one or more layers.

Because of the offset provided by the foamed polyolefin, the fraction of mineral filler material loaded within the container 100 may be greater than would otherwise be possible while maintaining the specific gravity of the container at a value that is below 1.0. For example, the mineral filler material may be present at a value of more than 5%, more than 7%, more than 8%, more than 10%, more than 15%, or more than 20% by weight. Such percentages may be relative to the layer in which the mineral filler material is included, or relative to the plastic container body as a whole.

Relatively higher mineral filler loading fractions allow for correspondingly greater reductions in the amount of polyolefin used in manufacture of the container. For example, the reduction in polyolefin resin usage may be at least 5%, at least 7%, at least 8%, at least 10%, at least 12%, at least 15%, or a range defined between any two such points (e.g., 8% to 12%).

In the embodiment shown in FIG. 3, exterior layer 114 may comprise a polyethylene matrix material and a colorant, such as titanium dioxide ($TiO_2$). Such a colorant may serve to opacify layer 114 (and sidewall 110), and/or provide a color (e.g., white) thereto. Any desired colorant may be included within layer 114 (or another layer). Although $TiO_2$ may be included primarily as a colorant, it has a density significantly higher than that of the polyethylene resin matrix material, increasing specific gravity of the container, similar to the effect caused by inclusion of a mineral filler material, such as calcium carbonate. For example, such a $TiO_2$ colorant may be provided as a concentrate, e.g., in which 45% by weight of the concentrate is actually $TiO_2$ while the remaining 55% may be polyethylene. In an embodiment, such included $TiO_2$ may be considered to form a portion of the mineral filler material, although another mineral filler material such as calcium carbonate may typically also be present (e.g., in an amount higher than the $TiO_2$ colorant).

Internal layer 116 may be sandwiched between exterior layer 114 and layer 118. Layer 116 may include a mineral filler material dispersed within the polyethylene matrix thereof. Such mineral filler may be included in an amount of at least 5% by weight of the layer in which it is included, or by weight of the container body as a whole. Higher percentages as described herein may be provided (e.g., more than 7%, more than 8%, more than 10%, more than 15%, or more than 20% by weight).

Third layer 118 may form the interior surface of container body 102. As with other layers 114 and 116, layer 118 may comprise a polyethylene matrix. A foaming agent (e.g., either chemical or physical) may be incorporated into the polyethylene resin from which layer 118 is formed, forming tiny cells within the matrix of layer 118. As a result, once the polyethylene resin layer 118 cools, the result is a layer 118 that comprises foamed polyethylene, including tiny cells or voids 120 present within the matrix of polyethylene. Cells or voids 120 include a very low density (e.g., they may be filled with the gaseous foaming agent). The inclusion of such a foamed polyethylene provides layer 118 with a specific gravity that is significantly lower than the specific gravity of the polyethylene material itself. The lower specific gravity of foamed layer 118 offsets at least some of the increase in specific gravity provided by the inclusion of the mineral filler material present within one or more layers. In an embodiment, the foamed polyethylene and the mineral filler material are not present within the same layer (i.e., one layer is foamed, while one or more other layers include the mineral filler material).

Figure 4:
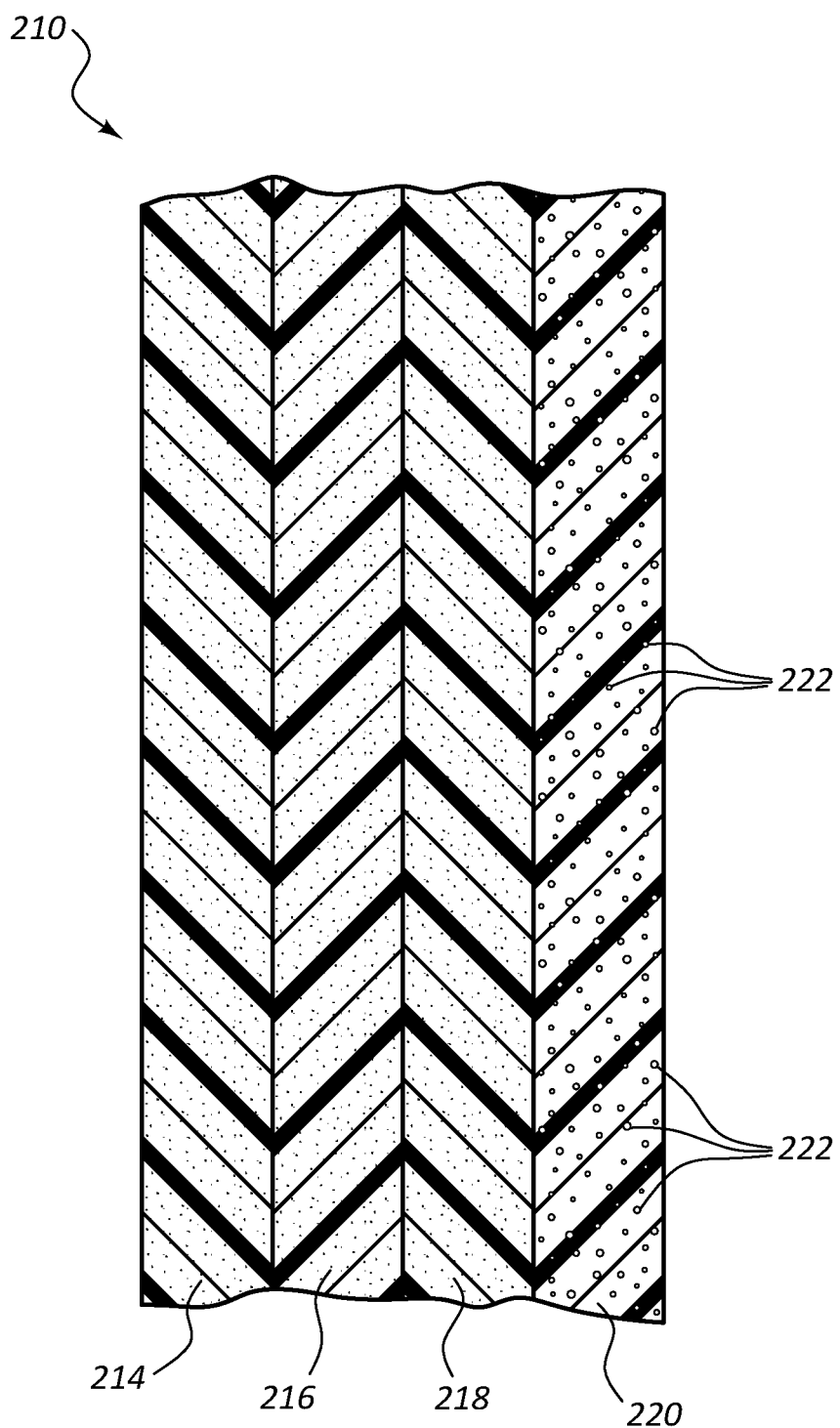
FIG. 4 is a cross-sectional view through an exemplary plastic container sidewall of the present invention, where the plastic container includes 4 layers.

FIG. 4 illustrates another embodiment of a sidewall 210, including 4 layers 214, 216, 218, and 220, each including polyethylene. Exterior layer 214 may provide the outer exposed exterior surface of sidewall 210. A colorant may be included within exterior layer 214 (or any of the layers). A mineral filler may be present within one or more of the layers. The polyethylene of one or more of the layers may be foamed (e.g., cells or voids 222 of layer 220).

Figure 5:
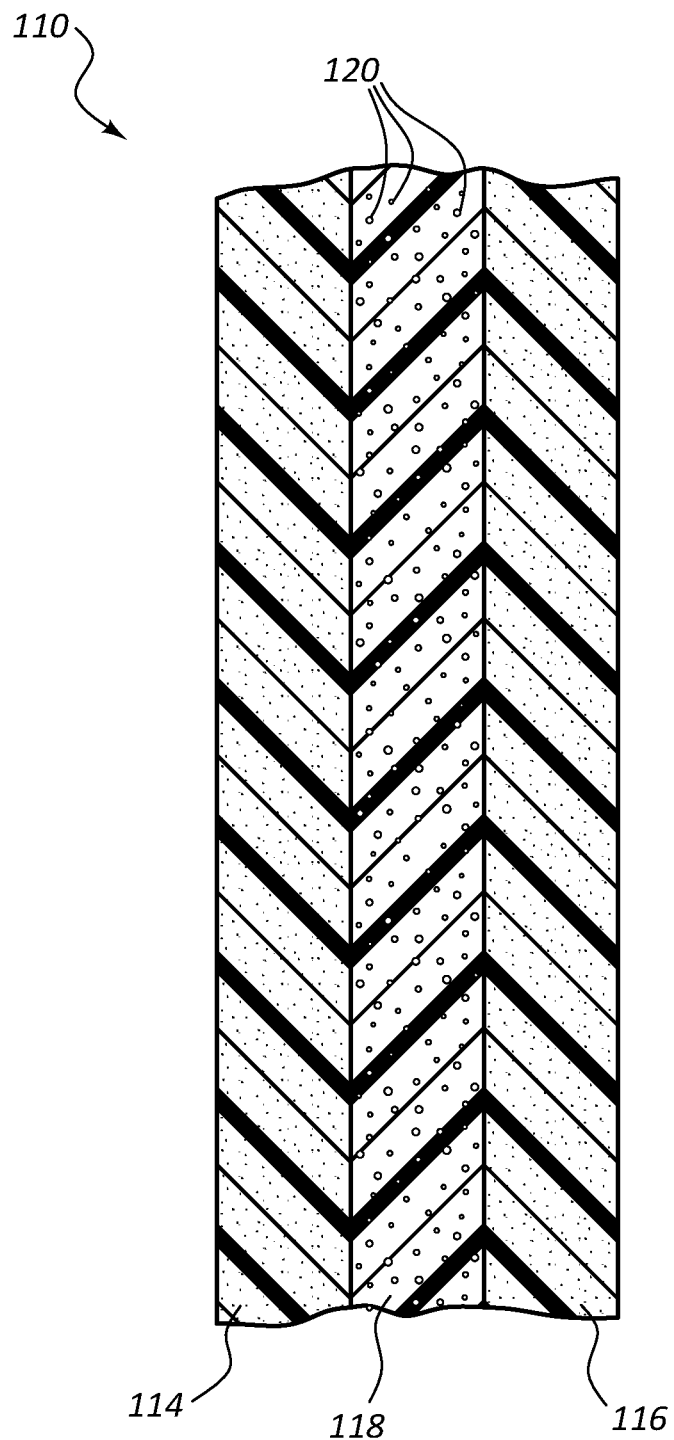
FIG. 5 is a cross-sectional view through another exemplary plastic container sidewall of the present invention, where the plastic container includes 3 layers.

As shown in FIGS. 3 and 4, in an embodiment, it may be beneficial that the foamed polyethylene layer be the innermost layer of the sidewall (i.e., forming the interior surface of container body 102). Such a configuration may maximize the cooling rate of the container body after blow molding, as heat is removed from the polyethylene resin material through the outermost layer of the bottle. In another embodiment, the foamed layer may be sandwiched between two adjacent layers, as seen in FIG. 5. This may be helpful as the interface or outer edge surfaces of the foamed layer may be rough, or somewhat uneven, due to the presence of cells or voids 120, which intersect the outer edge surface or interface. Such a sandwiched configuration may serve to fill over or cover any roughness resulting from such cells or voids at the outer edge surface of layer 118 (i.e., the interface between layer 118 and the adjacent sandwiching layers 114 and 116) so that neither the exterior surface nor an interior surface is roughened.

Foaming of one or more of the layers will result in a thicker layer than would otherwise be provided, all else being equal, except for the foaming. In other words, foaming a given layer will cause that layer to thicken and expand as it is foamed, as it accommodates the expansion of the bubbles of foaming agent grown therein. Such increased thickness may also serve to increase the overall thickness of the entire sidewall, which increases top loading strength of the wall at a given bottle weight, which advantageously provides for increased crush resistance.

For example, in an embodiment, a foamed layer may have a thickness from about 2 to about 15 mils, from about 15 to about 30 mils, or about 30 to about 90 mils. In an embodiment, the increase in thickness of the foamed layer may be from about 1 percent to about 10 percent, from about 10 to about 30 percent, or about 30 to about 90 percent. In an embodiment, the foamed layer may be the thickest of all the layers of the container sidewall. In an embodiment, the foamed layer may be 0 percent to about 50 percent thicker, 50 percent to about 200 percent thicker, or 200 percent to about 900 percent thicker than the next thickest layer of the sidewall.

The foaming agent may be included in an amount to provide a void volume of at least about 1%, at least 3%, at least 5%, at least about 10%, at least about 15%, from 15% to about 30%, from about 15% to about 25%, from 1% to 20%, from 10% to 20%, or any other ranges defined between endpoint values described above. Such percentages may be relative to the foamed layer, or relative to the container body as a whole.

A portion of the polyethylene resin material employed in manufacture of the bottle may be recycled, e.g., from post-industrial and/or post-consumer sources. In an embodiment, the recycled material is post-industrial material that may be reground (e.g., from off cuts and other scrap portions, rejected bottles etc.) and used in the formation of one or more of the layers. In another embodiment, post-consumer recycled materials, or combinations of post-consumer and postindustrial recycled materials may be employed. For example, a regrind ratio may be up to about 0.8 (i.e., 8 pounds of reground HDPE for every 10 pounds of virgin HDPE resin), from 0.2 to 0.7, or from 0.3 to 0.6. Stated another way, in some embodiments, the recycled materials may comprise from about 10% to 20%, from about 20% to about 40%, or from 40 to about 60% by weight of a given layer.

Figure 6:
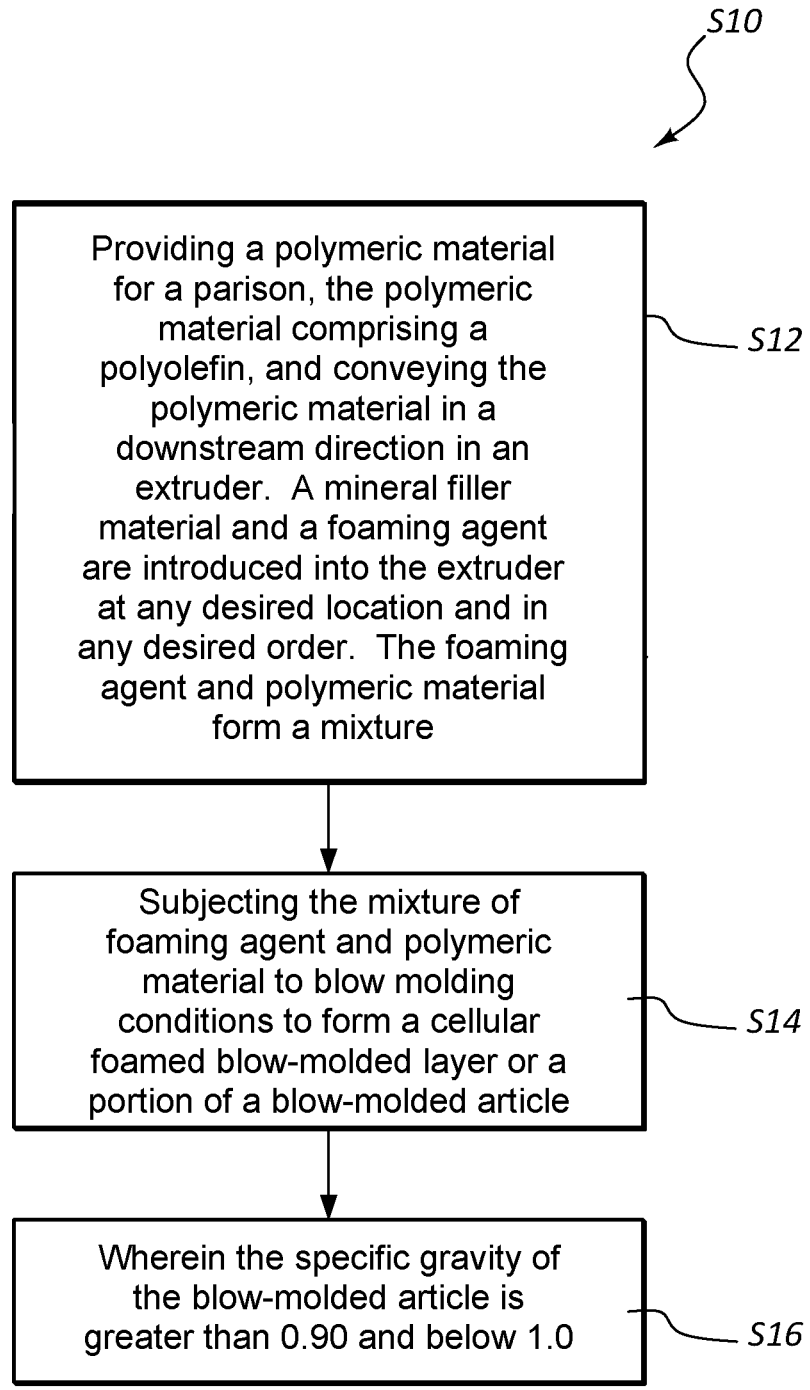
FIG. 6 is a flow chart illustrating an exemplary method for blow-molding a plastic container according to the present invention.

FIG. 6 describes a method S10 for forming a blow-molded plastic container. For example, at S12 a polymeric material for a parison is provided. The polymeric material may comprise a polyolefin having a density of less than 1.0 (e.g., polyethylene, polypropylene). The polymeric material may be conveyed in a downstream direction in an extruder (e.g., a blow-molding machine). A mineral filler material and a foaming agent may be introduced into the extruder in any order, and at any desired location along the extruder. The foaming agent and the polymeric material form a mixture. At S14, the mixture of the foaming agent and the polymeric material may be subjected to blow-molding conditions to form a cellular foamed blow-molded layer or portion of a blow-molded article. For example, the mixture may be subjected to conditions (e.g., rapid pressure drop) causing formation of a cellular foam where tiny cells of the foaming agent are dispersed (e.g., as closed cells) within a matrix of the polymeric material, and the sidewalls may be blown out towards the edges of the mold of the blow-molding machine. The blow-molded article may be removed from the blow-molding machine, and allowed to cool. At S16, the conditions are such that the specific gravity of the blow-molded article is greater than 0.90, and below 1.0.

For example, as described herein, the specific gravity of the blow-molded article (e.g., a container) including both a mineral filler material and a foaming agent dispersed within a polymeric matrix material (e.g., such as polyethylene, polypropylene) may be from 0.90 to below 1.0, from 0.95 to below 1.0, from 0.97 to below 1.0, or from 0.98 to below 1.0.

As described herein, the foaming agent introduced within the polymer resin melt may be maintained in a separate layer or portion from the mineral filler material (e.g., the layer(s) of the polymer that are foamed with the foaming agent may not include any significant fraction of the mineral filler material).

A small amount of a nucleating agent may be included with the foaming agent in the foamed layer, to nucleate formation of the desired tiny cells. Small amounts of talc or other nucleating agents may be employed. In some embodiments, the nucleating agent may be the same as the mineral filler material, although typically if included as a nucleating agent, its loading will be significantly lower than where included for purposes of acting as a filler. For example, such a nucleating agent may be present at 7% or less, less than 6%, less than 5%, less than 4%, less than 3%, less than 2%, or less than 1% by weight. Even where the same material is employed elsewhere in the container body as a mineral filler material, it will be apparent that its inclusion may be limited in the foamed layer (e.g., less than 5%), while it may be included in much higher fractions in other, non-foamed layers. Where a chemical foaming agent is employed (e.g., sodium bicarbonate and citric acid), no separate nucleating agent is needed, as such a foaming agent is self-nucleating. Nucleating agents may be included when employing physical blowing agents, such as nitrogen or carbon dioxide.

Polyethylene is an example of a particularly suitable polymeric resin material employed in the manufacture of the presently described blow-molded plastic containers. It will be appreciated that the polymeric material employed may advantageously have a specific gravity that is below 1.0, so as to allow the container formed therefrom to float. Relatively lower specific gravity values for a given polymeric resin material allows introduction of the mineral filler material (e.g., which includes a significantly higher specific gravity than the polymeric resin material) within the polymeric resin material at relatively higher weight fractions, while still maintaining the specific gravity of the manufactured container at a value that is below 1.0, so as to allow its separation from other materials within a floatation tank during or in preparation for recycling. Table 1 below shows specific gravity for some such plastic materials.

TABLE 1

| Plastic | Specific Gravity |
| --- | --- |
| Low Density Polyethylene (LDPE) | 0.91-0.93 |
| High Density Polyethylene (HDPE) | 0.94-0.97 |
| Polypropylene (PP) | 0.90-0.91 |
| Polystyrene (PS) | 1.04-1.07 |

TABLE 1-continued

| Plastic | Specific Gravity |
|---|---|
| Polyvinylchloride (PVC) | 1.35-1.45 |
| Acrylonitrile Butadiene Styrene (ABS) | 0.99-1.10 |
| Polyester | 1.38-1.39 |
| Polycarbonate | 1.2 |
| Nylon 66 | 1.13-1.15 |
| Polytetrafluoroethylene (TEFLON) | 2.1-2.2 |

Examples of potentially suitable polymeric resin materials include various grades of polyethylene (e.g., LDPE, HDPE), as well as polypropylene. It will be appreciated that blends of a plurality of polymeric resin materials may also be employed, in some embodiments. In some embodiments, it may be possible to even include polymeric resin materials having a specific gravity equal to or greater than 1.0 within a blend of resins, where the overall resin blend includes a specific gravity of less than 1.0. In an embodiment, HDPE may be particularly preferred.

Calcium carbonate may be preferred for use as the mineral filler material, although it will be apparent that other inorganic mineral filler materials may alternatively be employed. For example, talc may also represent a suitable mineral filler material. The specific gravity value of calcium carbonate is about 2.7, while that of talc is about 2.75. For example, the mineral filler material may typically have a specific gravity from about 1.5 to about 3.0 or from about 2.5 to about 3.0.

IV. Examples and Testing Data

Example 1

Trial samples of 1 liter round bottles were manufactured as described below. For each example, high density polyethylene from EQUISTAR was employed as the polymeric resin material. Some of the samples included foamed polyethylene, while others included foam and calcium carbonate as a mineral filler material. Each of the trial samples included 3 layers (A, B, and C), where layer A formed the exposed exterior surface of the bottle, layer C formed the interior surface of the bottle, and layer B was sandwiched between layers A and C (similar to the structures shown in FIGS. 3 and 5).

Within those examples that included a foamed polyethylene layer, the foam was generated using a chemical foaming agent of sodium bicarbonate and citric acid, available from CLARIANT CORP., located in Charlotte, N.C. It will be appreciated that other bases and acids (e.g., organic acids) may be employed. Physical foaming agents, such as carbon dioxide and/or nitrogen may alternatively be employed (e.g., injected into the appropriate extruder).

Example 1-1

Example 1-1 was a clear (i.e., no colorant) control, including polyethylene without any foamed polyethylene, and without any mineral filler material. The weight of the example was 53.9 g, and it had a specific gravity of 0.954.

| Component or Characteristic | Layer A | Layer B | Layer C |
|---|---|---|---|
| Layer % by Weight | 22 | 60 | 18 |
| TiO$_2$ | — | — | — |
| CaCO$_3$ | — | — | — |
| Foam | — | — | — |
| HDPE | 100% | 100% | 100% |

Example 1-2

Example 1-2 was a white (i.e., TiO$_2$ colorant) control, including polyethylene without any foamed polyethylene, and without any mineral filler material. The weight of the example was 54.3 g, and it had a specific gravity of 0.959.

| Component or Characteristic | Layer A | Layer B | Layer C |
|---|---|---|---|
| Layer % by Weight | 20 | 60 | 20 |
| TiO$_2$ concentrate | 7% | — | — |
| CaCO$_3$ | — | — | — |
| Foam | — | — | — |
| HDPE | 93% | 100% | 100% |

Example 1-3

Example 1-3 was a foamed bottle, without any colorant in any of the layers, to better visually ascertain the foam structure. None of the layers included any mineral filler material. The weight of the example was 49.7 g, and it had a specific gravity of 0.901. Based on the cost of materials involved, this example included a cost reduction as compared to the control (Example 1-2) of 4.1%. As the cost reduction is due to decreased use of the polyethylene resin, the weight or volume reduction in polyethylene use is similar (i.e., about 4%).

| Component or Characteristic | Layer A | Layer B | Layer C |
|---|---|---|---|
| Layer % by Weight | 24 | 52 | 24 |
| TiO$_2$ | — | — | — |
| CaCO$_3$ | — | — | — |
| Foam (HY1622) | — | 3% | — |
| HDPE | 100% | 97% | 100% |

Example 1-4

Example 1-4 was a foamed bottle, and included colorant in one of the layers. None of the layers included any mineral filler material. The weight of the example was 47.4 g, and it had a specific gravity of 0.894. Based on the cost of materials involved, this example included a cost reduction as compared to the control (Example 1-2) of 9.2%. As the cost reduction is due to decreased use of the polyethylene resin, the weight or volume reduction in polyethylene use is similar (i.e., about 9%). The foaming agent employed in this example was more concentrated or active than that employed in Example 1-3, increasing the amount of foam (i.e., increasing the overall volume occupied by the foam cells).

| Component or Characteristic | Layer A | Layer B | Layer C |
|---|---|---|---|
| Layer % by Weight | 19.5 | 61 | 19.5 |
| TiO$_2$ concentrate | — | 0.9% | — |

| Component or Characteristic | Layer A | Layer B | Layer C |
|---|---|---|---|
| CaCO₃ | — | — | — |
| Foam (J-001) | — | 2% | — |
| HDPE | 100% | 97.1% | 100% |

Example 1-5

Example 1-5 was a foamed bottle, and included colorant in one of the layers at a level providing similar opacity as the control Example 1-2. Because of the presence of the foamed layer, which contributes to the opaque white color, less $TiO_2$ colorant is needed to achieve a similar degree of opacity. None of the layers included any mineral filler material. The weight of the example was 47.8 g, and it had a specific gravity of 0.895. Based on the cost of materials involved, this example included a cost reduction as compared to the control (Example 1-2) of 8.6%. As the cost reduction is due to decreased use of the polyethylene resin, the weight or volume reduction in polyethylene use is similar (about 9%). The foaming agent employed in this example was the same as that employed in Example 1-4.

| Component or Characteristic | Layer A | Layer B | Layer C |
|---|---|---|---|
| Layer % by Weight | 20 | 60 | 20 |
| TiO₂ concentrate | 2.3% | — | — |
| CaCO₃ | — | — | — |
| Foam (J-001) | — | 2% | — |
| HDPE | 97.7% | 98% | 100% |

Example 1-6

Example 1-6 was a foamed bottle similar to Example 1-5, but included a higher concentration of the foaming agent, which further thickens the bottle wall. The weight of the example was 48.0 g, and it had a specific gravity of 0.899. Based on the cost of materials involved, this example included a cost reduction as compared to the control (Example 1-2) of 5.5%. As the cost reduction is due to decreased use of the polyethylene resin, the weight or volume reduction in polyethylene use is similar (about 6%).

| Component or Characteristic | Layer A | Layer B | Layer C |
|---|---|---|---|
| Layer % by Weight | 23 | 56 | 22 |
| TiO₂ concentrate | 2.3% | — | — |
| CaCO₃ | — | — | — |
| Foam (J-001) | — | 3% | — |
| HDPE | 97.7% | 97% | 100% |

Example 1-7

Example 1-7 was a foamed bottle also including calcium carbonate mineral filler material, and a colorant in at least one of the layers. The weight of the example was 49.0 g, and it had a specific gravity of 0.933. Based on the cost of materials involved, this example included a cost reduction as compared to the control (Example 1-2) of 12.6%. As the cost reduction is due to decreased use of the polyethylene resin, the weight or volume reduction in polyethylene use is similar (about 13%). In Example 1-7, without the foamed layer, the weighted average specific gravity of the bottle would be greater than 1.0 (i.e., about 1.01). The $CaCO_3$ mineral filler material employed in this example was a concentrate including 80% calcite, with a specific gravity of 1.96. The $TiO_2$ colorant material employed in this example was similarly a concentrate (e.g., 45% $TiO_2$), with a specific gravity value of 1.52. The mineral filler concentrate comprised 10.6% (8.48% $CaCO_3$) by weight of the bottle as a whole. Including the $TiO_2$ colorant, the mineral filler and colorant together (because both have a similar effect on specific gravity) comprised about 8.8% by weight of the bottle as a whole.

| Component or Characteristic | Layer A | Layer B | Layer C |
|---|---|---|---|
| Layer % by Weight | 18.5 | 63 | 18.5 |
| TiO₂ concentrate | 2.3% | — | — |
| CaCO₃ concentrate | 28.5% | — | 28.5% |
| Foam (J-001) | — | 3% | — |
| HDPE | 69.2% | 97% | 71.5% |

Example 1-8

Example 1-8 was a foamed bottle also including calcium carbonate mineral filler material, a colorant in at least one of the layers, and recycled polyethylene material within at least one of the layers. The weight of the example was 49.4 g, and it had a specific gravity of 0.945. Based on the cost of materials involved, this example included a cost reduction as compared to the control (Example 1-2) of 12.3%. As the cost reduction is due to decreased use of the polyethylene resin, the weight or volume reduction in polyethylene use is similar (about 12%).

As in Example 1-7, the $CaCO_3$ mineral filler concentrate material employed in this example was 80% calcite, with a specific gravity of 1.96. The $TiO_2$ colorant material employed in this example was similarly a concentrate (e.g., 45% $TiO_2$), with a specific gravity value of 1.52. The mineral filler concentrate comprised 9.4% by weight of the bottle as a whole. Including the $TiO_2$ colorant, the mineral filler and colorant together (because both have a similar effect on specific gravity) comprised about 10.2% by weight of the bottle as a whole. Without the foamed layer, the specific gravity of the bottle would be greater than 1.0 (i.e., about 1.02). All of the $TiO_2$ colorant used in the Examples was 45% $TiO_2$ by weight. Recycled polyethylene in the form of post-industrial waste material (e.g., reground polyethylene material from previous bottle production) was reground and put into the bottle, in layer B. The inclusion of such recycled post-industrial material was compatible with foaming of layer B, such that the strength characteristics of the resulting bottle were similar to those of Example 1-7, which did not include such recycled polyethylene material.

| Component or Characteristic | Layer A | Layer B | Layer C |
|---|---|---|---|
| Layer % by Weight | 18.5 | 63 | 18.5 |
| TiO₂ | 2.3% | 0.9% | — |
| CaCO₃ | 20% | 7% | 20% |
| Foam (J-001) | — | 3% | — |
| HDPE | 77.7% | 89.1% | 80% |

Example 1-8 includes both $CaCO_3$ filler and foaming within the same layer (e.g., layer B). While possible in some embodiments, a configuration similar to Example 1-7 may be preferred over inclusion of mineral filler material and foaming within the same layer, as it was observed upon microscopic examination that the cell walls in the foamed layer ruptured, which results in a roughened texture, as compared to Example 1-7, where the foamed layer does not include any mineral filler (or inorganic mineral colorant). In Example 1-7, the cells rather were believed to start out round, and to become elongated as the bottle was blown out during blow-molding, but that the cells did not rupture, but remained closed, generally intact. The practical effects of any roughened texture at the interface of a layer that is both foamed and includes mineral formulated with a filler material may be minimized by sandwiching such a layer between layers which do not include both foaming and a mineral filler, as in Example 1-8.

Example 2

Containers such as those manufactured according to Example 1 above may be employed to hold disinfecting wipes, or other contents, as shown in FIG. 1. An important characteristic of such canister shaped containers is "Dynamic Vertical Load", where a lid (e.g., injection molded from similar plastic materials) is placed on the container, and the container with lid is slowly crushed. Force versus displacement curves may be generated from the data generated during such a test. A relatively higher peak load force value is desirable, indicating the container exhibits relatively higher resistance to being crushed. Such a characteristic is important as pallets of such containers are typically stacked in warehouses, trucks, and stores during storage and transportation. Too low of a dynamic vertical load value correlates to containers at the bottom of such stacks of pallets becoming crushed, and unusable. Data from the Dynamic Vertical Load test is presented in Table 2, below, for several tested examples, including some of those of Example 1.

TABLE 2

| Sample | Peak Load (lbf) | Displacement @ Peak Load | Load @ 0.05 in-lbf | Load @ 0.25 in-lbf | Load @ 0.125 in-lbf | Weight (grams) |
|---|---|---|---|---|---|---|
| Control 1-1 | 68.00 | 0.17 | 43.61 | 56.72 | 61.73 | 53.95 |
| Control 1-2 | 68.38 | 0.17 | 43.83 | 57.18 | 62.01 | 53.91 |
| Control 2-1 | 67.61 | 0.17 | 42.56 | 56.24 | 61.32 | 54.69 |
| Control 2-2 | 68.68 | 0.17 | 44.38 | 58.52 | 61.15 | 54.40 |
| 3-1 | 79.63 | 0.22 | 41.65 | 78.27 | 58.72 | 50.13 |
| 3-2 | 84.93 | 0.22 | 43.64 | 83.56 | 63.04 | 52.37 |
| 4-2 | 76.54 | 0.22 | 36.16 | 75.15 | 56.88 | 48.97 |
| 5-1 | 64.93 | 0.22 | 25.84 | 61.58 | 51.47 | 47.40 |
| 5-2 | 78.39 | 0.24 | 34.44 | 77.93 | 54.69 | 49.16 |
| 6-1 | 77.53 | 0.23 | 37.00 | 76.53 | 56.67 | 49.27 |
| 6-2 | 73.28 | 0.21 | 33.71 | 70.57 | 57.03 | 49.00 |
| 7-1 | 69.74 | 0.22 | 31.97 | 67.79 | 53.45 | 48.90 |
| 7-2 | 66.88 | 0.21 | 29.28 | 63.12 | 52.16 | 48.80 |
| 8-1 | 54.80 | 0.17 | 26.51 | 40.68 | 50.57 | 47.43 |
| 8-2 | 69.25 | 0.17 | 35.43 | 56.33 | 61.24 | 49.76 |

As shown, control samples 1 and 2 (Control 1-1, Control 1-2 and Control 2-1 and Control 2-2), which correspond to Examples 1-1 and 1-2 of Example 1, together averaged a peak maximum load of 68.2 lbf at a bottle weight of 54.2 g. Samples 7-1 and 7-2 (corresponding to Example 1-7) averaged a peak maximum load of 68.3 lbf at a bottle weight of 48.9 g. In other words, while exhibiting a reduction in bottle weight of about 10%, Example 1-7 was able to achieve a peak maximum load approximately equal to that of the control. Furthermore, the reduction in polyethylene resin usage is approximately equal to the bottle weight reduction, as about 9% of the polyethylene resin is replaced by the mineral filler material. Such lower petrochemical use (i.e., reduced polyethylene resin use) is a major environmental sustainability and cost reduction benefit. There are two reasons for resin use reduction. First, the drop in weight occurs because we choose to put less material in the bottle (i.e. we slow down the extruder but keep the rate of bottle making the same). The second reduction in resin use occurs because we replace resin with mineral. The drop in petrochemical use is the combination of the drop in weight of the bottle plus the percent of resin replaced by mineral.

In an embodiment, the inventive containers exhibit peak load values that are similar to or greater than those of existing containers, formed without foam and without mineral filler materials (other than $TiO_2$ for coloring). For example, the peak load value of these one liter foamed and mineral filled plastic containers may be at least 50 lbf, at least 55 lbf, at least 60 lbf, from 50 lbf to about 100 lbf, from 55 lbf to 90 lbf, or from 60 lbf to 75 lbf.

In addition to exhibiting excellent peak load value (i.e., crush strength) characteristics, the foamed and mineral filled plastic containers may exhibit reduced petrochemical (e.g., polyethylene) usage of at least 5%, at least 7%, at least 8%, at least 9%, at least 10%, from 8% to 25%, from 8% to 20%, from 8% to 15%, from 9% to 20%, from 9% to 15%, or from 10% to 15%.

Example 3

Example 3 describes additional hypothetical proposed multi-layer trial samples similar to those of Example 1. For each example, high density polyethylene from EQUISTAR is employed as the polymeric resin material. Some of the samples include foamed polyethylene, while others included foam and calcium carbonate as a mineral filler material. Each of the trial samples includes 3 layers (A, B, and C), where layer A forms the exposed exterior surface of the bottle, layer C forms the interior surface of the bottle, and layer B is sandwiched between layers A and C (e.g., similar to the structure of FIGS. 3 and 5).

Within those examples that include a foamed polyethylene layer, the foam may be generated using a chemical foaming agent of sodium bicarbonate and citric acid, available from CLARIANT CORP., located in Charlotte, N.C. It will be appreciated that other bases and acids (e.g., organic acids) may alternatively be employed. Physical foaming agents or blowing agents, such as carbon dioxide and/or nitrogen may alternatively be employed (e.g., injected into the appropriate extruder).

Example 3-1

Example 3-1 is a white colored (i.e., including $TiO_2$ colorant in exterior layer A) control, including polyethylene without any foamed polyethylene, and without any mineral filler material. The regrind ratio of the HDPE material in layer B is 0.6 (i.e., 6 lbs of reground HDPE material is included for every 10 lbs of virgin HDPE material).

| Component or Characteristic | Layer A | Layer B | Layer C |
|---|---|---|---|
| Layer % by Weight | 20 | 60 | 20 |
| $TiO_2$ concentrate | 7% | — | — |

-continued

| Component or Characteristic | Layer A | Layer B | Layer C |
|---|---|---|---|
| CaCO$_3$ | — | — | — |
| Foam | — | — | — |
| HDPE | 93% | 100% | 100% |

Example 3-2

Example 3-2 is a white colored (i.e., including TiO$_2$ colorant in exterior layer A) test sample, including polyethylene with a foamed polyethylene internal layer, and without any mineral filler material. The regrind ratio of the HDPE material in layer B is 0.6 (i.e., 6 lbs of reground HDPE material is included for every 10 lbs of virgin HDPE material). The inclusion of foaming within layer B allows for a reduction in the TiO$_2$ content in layer A, while providing a similar degree of opacity to the bottle (similar to Example 1-5).

| Component or Characteristic | Layer A | Layer B | Layer C |
|---|---|---|---|
| Layer % by Weight | 20 | 60 | 20 |
| TiO$_2$ concentrate | 3% | — | — |
| CaCO$_3$ | — | — | — |
| Foam | — | 3.3% | — |
| HDPE | 97% | 96.7% | 100% |

Example 3-3

Example 3-3 is a white colored (i.e., including TiO$_2$ colorant in exterior layer A) test sample, including polyethylene with a foamed polyethylene internal layer, and which also includes mineral filler material within layers A and C. No regrind HDPE material is included in any of the layers. The inclusion of foaming within layer B allows for a reduction in the TiO$_2$ content in layer A, while providing a similar degree of opacity to the bottle (similar to Example 3-2). The CaCO$_3$ concentrate is 70% CaCO$_3$ (e.g., with the 30% balance being HDPE), so that the CaCO$_3$ content within layers A and C is 24.5%, and the bottle as a whole includes a CaCO$_3$ content of 9.8% by weight. The TiO$_2$ is a concentrate including 45% TiO$_2$ (with the remainder being HDPE) so that the bottle has a TiO$_2$ content of 0.27%. Content of CaCO$_3$ plus TiO$_2$ is 10.07%. The bottle has a specific gravity of greater than 0.9 and less than 1.0.

| Component or Characteristic | Layer A | Layer B | Layer C |
|---|---|---|---|
| Layer % by Weight | 20 | 60 | 20 |
| TiO$_2$ concentrate | 3% | — | — |
| CaCO$_3$ concentrate | 35% | — | 35% |
| Foam | — | 3.3% | — |
| HDPE | 62% | 96.7% | 65% |

Example 3-4

Example 3-4 is a white colored (i.e., including TiO$_2$ colorant in exterior layer A) test sample, including polyethylene with a foamed polyethylene internal layer, and which also includes mineral filler material within layers A and C. The regrind ratio of the HDPE material in layer B may be up to 0.6 (i.e., 6 lbs of reground HDPE material is included for every 10 lbs of virgin HDPE material). The inclusion of foaming within layer B allows for a reduction in the TiO$_2$ content in layer A, while providing a similar degree of opacity to the bottle (similar to Example 3-2). The CaCO$_3$ concentrate is 70% CaCO$_3$ (e.g., with the 30% balance being HDPE), so that the CaCO$_3$ content within layers A and C is 24.5%, and the bottle as a whole includes a CaCO$_3$ content of 9.8% by weight. The TiO$_2$ is a concentrate including 45% TiO$_2$ (with the remainder being HDPE) so that the bottle has a TiO$_2$ content of 0.27%. Content of CaCO$_3$ plus TiO$_2$ is 10.07%. The bottle has a specific gravity of greater than 0.9 and less than 1.0.

| Component or Characteristic | Layer A | Layer B | Layer C |
|---|---|---|---|
| Layer % by Weight | 20 | 60 | 20 |
| TiO$_2$ concentrate | 3% | — | — |
| CaCO$_3$ concentrate | 35% | — | 35% |
| Foam | — | 3.3% | — |
| HDPE | 62% | 96.7% | 65% |

Example 3-5

Example 3-5 is a white colored (i.e., including TiO$_2$ colorant in exterior layer A) control sample, including polyethylene with a foamed polyethylene internal layer C, and which does not include mineral filler material within any of the layers. No recycled reground HDPE material is included in any of the layers. The inclusion of foaming within layer C (which forms the interior surface of the bottle) allows for a reduction in the TiO$_2$ content in layer A, while providing a similar degree of opacity to the bottle (similar to Example 3-2).

| Component or Characteristic | Layer A | Layer B | Layer C |
|---|---|---|---|
| Layer % by Weight | 20 | 60 | 20 |
| TiO$_2$ concentrate | 3% | — | — |
| CaCO$_3$ | — | — | — |
| Foam | — | — | 3.3% |
| HDPE | 97% | 100% | 96.7% |

Example 3-6

Example 3-6 is a white colored (i.e., including TiO$_2$ colorant in exterior layer A) test sample, including polyethylene with a foamed polyethylene internal layer C, and which includes mineral filler material within layers A and B. The regrind ratio of the HDPE material in layer B may be up to 0.6 (i.e., 6 lbs of reground HDPE material is included for every 10 lbs of virgin HDPE material). The inclusion of foaming within layer C (which forms the interior surface of the bottle) allows for a reduction in the TiO$_2$ content in layer A, while providing a similar degree of opacity to the bottle (similar to Example 3-2). The CaCO$_3$ concentrate is 70% CaCO$_3$ (e.g., with the 30% balance being HDPE), so that the CaCO$_3$ content within layers A and C is 12.6%, and the bottle as a whole includes a CaCO$_3$ content of 10.08% by weight. The TiO$_2$ is a concentrate including 45% TiO$_2$ (with the remainder being HDPE) so that the bottle has a TiO$_2$ content of 0.27% (10.35% for CaCO$_3$ plus TiO$_2$).

| Component or Characteristic | Layer A | Layer B | Layer C |
| --- | --- | --- | --- |
| Layer % by Weight | 20 | 60 | 20 |
| $TiO_2$ concentrate | 3% | — | — |
| $CaCO_3$ concentrate | 18% | 18% | — |
| Foam | — | — | 3.3% |
| HDPE | 79% | 82% | 96.7% |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A blow-molded plastic article with multiple layers comprising:
   (a) a first layer that is not cellular foamed comprising: a polymeric material mixed with about 8% to 35% by weight of a mineral filler comprising: calcium carbonate; and
   (b) a second layer, different term the first layer, comprising polymeric material and a foaming agent;
   wherein the foaming agent is introduced into an extruder with the polymeric material to form a mixture and said mixture is subjected to blow-molding conditions to form a cellular foamed blow-molded article and wherein the specific gravity of the blow-molded article is greater than 0.90 and below 1.0.

2. The blow-molded plastic article of claim 1, wherein the polymeric material comprises polyethylene.

3. The blow-molded plastic article of claim 1, wherein the foaming agent is a physical foaming agent.

4. The blow-molded plastic article of claim 1, wherein the foaming agent is a physical foaming agent selected from the group consisting of carbon dioxide, nitrogen, and combinations thereof.

5. The blow-molded plastic article of claim 1, wherein the foaming agent is a chemical foaming agent.

6. The blow-molded plastic article of claim 1, wherein the cellular blow-molded article is a container.

7. The blow-molded plastic article of claim 1, wherein the first layer comprises a colorant.

8. The blow-molded plastic article of claim 6, wherein the container comprises two or more layers.

9. The blow-molded plastic article of claim 8, wherein at least one of the layers has a different thickness than at least one other layer.

10. The blow-molded plastic article of claim 8, wherein the foaming agent comprises: sodium bicarbonate and citric acid.

11. The blow-molded plastic article of claim 8, wherein at least one layer of the container wherein the container comprises three or more layers.

12. A blow-molded plastic container with multiple layers comprising:
    (a) a non-foamed exterior first layer comprising: a polymeric material and about 8% to 35% by weight of calcium carbonate;
    (b) a cellular foamed interior second layer comprising polymeric material; and
    (c) an interior third layer comprising: polymeric material and about 8% to 35% by weight of calcium carbonate;
    wherein a foaming agent is introduced into an extruder with the polymeric material of the interior second layer and a mixture is formed and said mixture is subjected to blow-molding conditions to form a cellular formed blow-molded article.

13. The blow-molded plastic container of claim 12, wherein the foaming agent comprises: sodium bicarbonate and citric acid.

14. The blow-molded plastic container of claim 12, wherein the polyolefin comprises polyethylene.

15. The blow-molded plastic container of claim 12, wherein the foaming agent is a physical foaming agent.

16. The blow-molded plastic container of claim 15, wherein the foaming agent is a physical foaming agent selected from the group consisting of carbon dioxide, nitrogen, and combinations thereof.

17. The blow molded plastic container of claim 12, wherein the foaming agent is a chemical foaming agent.

18. The blow-molded plastic container of claim 12, wherein the exterior first layer comprises a colorant.

19. The blow-molded plastic container of claim 12, wherein the interior third layer comprises about 8% to 20% by weight of calcium carbonate.

20. The blow-molded plastic container of claim 12, wherein at least one of the layers has a different thickness than at least one other layer.

* * * * *